US 6,207,942 B1

United States Patent
Ohyama (10) Patent No.: US 6,207,942 B1
(45) Date of Patent: Mar. 27, 2001

(54) OPTICAL PICKUP DEVICE, ERROR DETECTION DEVICE, AND DETECTION METHOD THEREFORE

(75) Inventor: Minoru Ohyama, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 0 days.

(21) Appl. No.: 09/286,107

(22) Filed: Apr. 2, 1999

(30) Foreign Application Priority Data

Apr. 8, 1998 (JP) ................................................ 10-096365

(51) Int. Cl.⁷ ................................. G01J 1/20; G11B 7/00
(52) U.S. Cl. ..................... 250/201.5; 369/44.32; 369/44.38; 369/109
(58) Field of Search ................. 250/201.5; 369/44.12, 369/44.23, 44.26, 44.32, 44.37, 44.38, 109, 112

(56) References Cited

U.S. PATENT DOCUMENTS

| Re. 35,332 | * | 9/1996 | Nagahama et al. | 250/201.5 |
|---|---|---|---|---|
| 5,627,812 | | 5/1997 | Yamamoto et al. | 369/112 |
| 5,673,241 | | 9/1997 | Koyama et al. | 369/44.23 |
| 5,696,750 | * | 12/1997 | Katayama | 369/109 |
| 5,729,519 | * | 3/1998 | Nakanishi et al. | 369/109 |
| 5,737,296 | | 4/1998 | Komma et al. | 369/103 |
| 5,859,819 | * | 1/1999 | Miyabe et al. | 369/44.23 |
| 5,917,800 | * | 6/1999 | Choi | 369/110 |
| 6,014,689 | * | 8/2000 | Noguchi | 369/112 |
| 6,088,310 | * | 7/2000 | Yanagawa | 369/44.38 |

FOREIGN PATENT DOCUMENTS

| 0 467 216 A2 | 1/1992 | (EP) . |
|---|---|---|
| 05274684 | 10/1993 | (EP) . |
| 0 740 295 A1 | 10/1996 | (EP) . |
| 4-292848 | 10/1992 | (JP) . |
| 5-064348 | 3/1993 | (JP) . |
| 5-075961 | 4/1993 | (JP) . |
| 8-173382 | 7/1996 | (JP) . |

OTHER PUBLICATIONS

Pioneer R&D 1997 vol. 7, No. 1, pp. 48–52 (Jun. 30, 1997), "Generation of Tracking Error Signal by Phase Difference".
National Technical Report vol. 43, No. 3, pp. 275–282 (Jun. 1997).

* cited by examiner

*Primary Examiner*—Stephone B. Allen
(74) *Attorney, Agent, or Firm*—Nath & Associates PLL; Gary M. Nath

(57) ABSTRACT

A reflected beam 6 is diffracted by regions 7a and 7b of a hologram 71, these diffracted beams are converged or diverged, and ±1-order diffracted beams from each region are received by light-receiving regions 9a+ to 9b− arranged apart from the center of the hologram by a distance almost optically equal to the distance between the center point of the hologram and a convergence (focal) point of the 0-order reflected beam. Three signals obtained from three regions of each light-receiving region are calculated to obtain a focus signal, and, at the same time, signals obtained from four regions of each light-receiving region are calculated to obtain a tracking signal, so that, by using both the ±1-order diffracted beams, a focus error signal detected by the SSD method and a tracking error signal detected by the DPD method are simultaneously obtained with high efficiency and high precision.

6 Claims, 9 Drawing Sheets

FIG. 2A PRIOR ART  FES=0

FIG. 2B PRIOR ART  FES>0

FIG. 2C PRIOR ART  FES<0

FIG. 3A PRIOR ART  FES=0

FIG. 3B PRIOR ART  FES>0

FIG. 3C PRIOR ART  FES<0

OPTICAL PICKUP DEVICE, ERROR DETECTION DEVICE, AND DETECTION METHOD THEREFORE

BACKGROUND OF THE INVENTION

1. Field of the Invention

The present invention relates to an optical pickup device used in a reading apparatus for an information recording medium such as an optical disk(disc) on which optical information is recorded in the form of tracks and, more particularly, an error detection device and a method therefor which are suitable for a reproduction system being compatible with a DVD (Digital Versatile Disc) and a CD (Compact Disc).

2. Description of the Related Art

Although CDs serving as public optical disk systems are generally popularized, in recent years, DVD systems having higher densities are proposed and merchandised to be popularized. In a DVD player serving as a reproduction apparatus, in order to avoid apparatuses from overlapping or cumbersome use of the apparatus, reproduction being compatible with a CD must be performed. For this reason, a technique for reproducing disks having two types of standards is developed, and simplification and reduction in cost of an arrangement for realizing the technique are demanded.

A tracking scheme(system) is proposed as one of CD/DVD compatible reproduction techniques. In a CD system, a so-called "three-beam method" which detects a tracking error signal by using two sub-beams arranged before and after a main beam is used. Uneven portions called pits are formed in a CD to record information, and a pit array is called a track. In this three-beam method, two sub-beams are symmetrically arranged with predetermined distances from a main beam, and the two sub-beams are reversely offset by predetermined amounts in a direction perpendicular to the track. When the sub-beams are on the track, average amounts of light decrease. More specifically, when both the sub-beams are offset by equal amounts with respect to a desired track, the main beam is on the desired track. In other words, it is used that the amounts of light of both the sub-beams are equal to each other when the main beam is on the desired track. That is, when the main beam is offset from the track, the amounts of light being incident on two PDs (Photo Detectors) are different from each other. When the main beam is on the track, the amounts of light being incident on the two PDs are equal to each other, and, as a result, a tracking error can be detected.

However, in this method, the following disadvantages are observed. That is, beam positions suitable for two types of disks having different track pitches cannot be easily set, and offsetting easily occurs by a reflected beam from a non-read layer (non-recording layer) in a two-layer disk such as a DVD. For these reasons, in CD/DVD compatible reproduction, a "DPD method" (Differential Phase Detection) using a phase difference formed on four divided portions of a PD (Photo Detector) when the beam traverses the tracks is mainly used (reference: "Development of New Servo Function for DVD Player": Higuchi, Pioneer R & D Vol. 7 No. 1 from pp. 47).

On the other hand, to satisfy the requests for a reduction in cost and miniaturization, an attempt to integrate an optical pickup system is advanced, a device obtained by integrating a semiconductor laser (LD), a PD, and a hologram element (HOE: Holographic Optical Element) is developed. The device has been applied to not only a CD but also a DVD (reference: "Integrated Optical Head for DVD": Mizuno et al., National Technical Report Vol. 43 No. 3 Jun. 1997 pp. 275).

As described in this reference, in an integrated device in which an LD and a PD can be arranged to be close each other, a diffracted beam obtained by an HOE and the light emission point of an LD can be easily arranged at almost conjugate positions. Focus error detection by a complementary "SSD method" (Spot Size Detection) using ±1-order (±1st-order) diffracted beams obtained by the HOE can be realized.

Figure 1A:
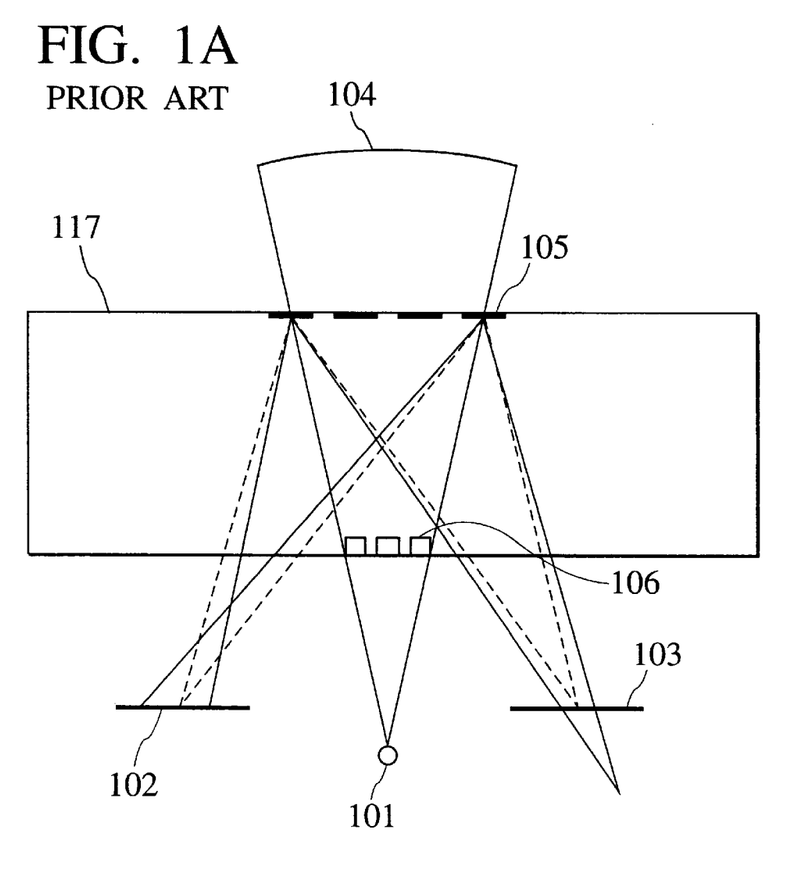
FIG. 1A is a sectional view showing the relationship between a hologram substrate, a five-piece light-receiving element, and a light emission point.
Figure 1B:
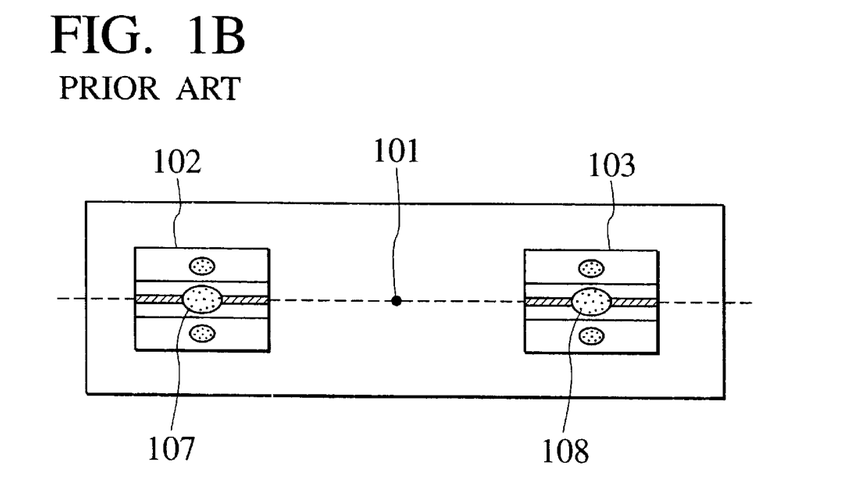
FIG. 1B is a plan view showing two five-piece light-receiving elements arranged on a silicon substrate and the position of an LD serving as a light emission point.

The principle of the SSD method is shown in FIGS. 1A to 3C. FIG. 1A is a sectional view showing the relationship between a hologram substrate 117, five-piece light-receiving elements 102 and 103, and a light emission point 101, and FIG. 1B is a plan view showing the two five-piece light-receiving elements 102 and 103 arranged on a silicon substrate and the position of an LD serving as the light emission point 101. A grating pattern 106 is arranged on the lower surface of the hologram substrate 117, and a hologram pattern 105 is arranged on the upper surface. A laser beam 104 emitted from the light emission point 101 is diffracted by the grating pattern 106 on the lower surface of the hologram substrate 117 to be three beams, i.e., a 0-order (0th-order) beam (main beam) and ±1-order diffracted beams. The three beams are focused on a disk (not shown) arranged above an objective lens (not shown) through the objective lens arranged above the hologram substrate 117. The reflected beams from the disk pass through the objective lens to be diffracted by the hologram pattern 105 on the upper surface of the hologram substrate 117. The diffracted ±1-order beams are received by the two five-piece light-receiving elements 102 and 103. Although each of the five-piece light-receiving elements 102 and 103 is divided by five, three central PD's(Photo Detectors) PD1, PD2, and PD3 (see FIGS. 2A to 2C) and three central PD's(Photo Detectors) PD4, PD5, and PD6(see FIGS.3A to 3C) of the five-piece light-receiving elements 102 and 103 are used in the SSD. The two remaining PDs on both the sides of each five-piece light-receiving element are used in the tracking scheme of the three-beam method.

Figure 2A:
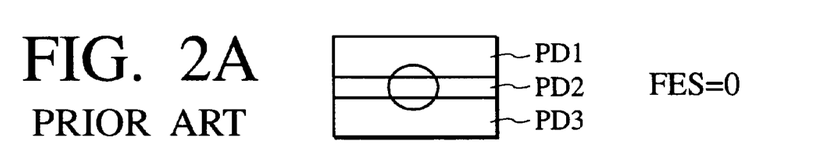
FIGS. 2A, 2B, and 2C are sectional views showing a change in spot size depending on different focal positions of a +1-order diffracted beam in the conventional SSD method.
Figure 2B:
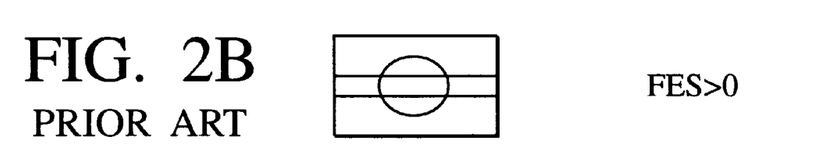
Figure 2C:
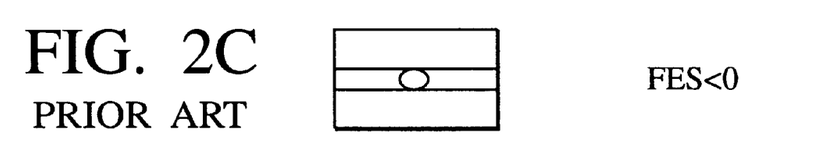
Figure 3A:
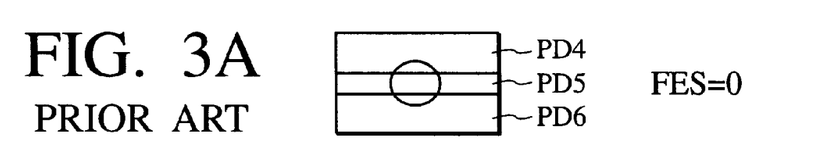
FIGS. 3A, 3B, and 3C are sectional views showing a change in spot size depending on different focal positions of a -1-order diffracted beam in the conventional SSD method.
Figure 3B:
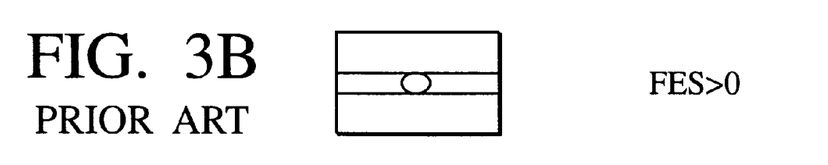
Figure 3C:
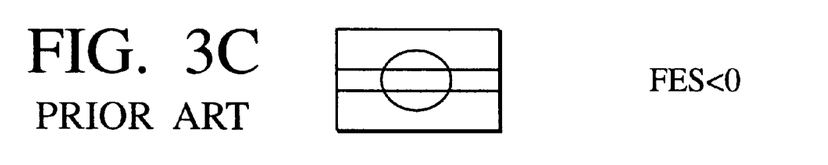

FIG. 1A illustrates a case wherein the +1-order(+1st-order) diffracted beam diffracted by the hologram pattern 105 is focused in front of the five-piece ligh-treceiving element 102, the −1-order(−1st-order) diffracted beam is subjected to a divergent effect and focused after the −1-order diffracted beam passes through the light-receiving surface of the five-piece light-receiving element 103. FIGS. 2A to 2C show spot sizes which change depending on the focal positions of the three central PD's PD1, PD2, and PD3 of the five-piece light-receiving element 102, and FIGS. 3A to 3C show spot sizes which change depending on the focal positions of the three central PD's PD4, PD5, and PD6. FIGS. 2A and 3A show the spot sizes obtained in an in-focus state, FIGS. 2B and 3B show the spot sizes obtained when the disk is distant, and FIGS. 2C and 3C show the spot sizes obtained when the disk is close. As shown in FIGS. 2B and 3B, when the disk is distant from the objective lens, the spot size of the +1-order diffracted beam is large, and the spot size of the −1-order diffracted beam is small. In contrast to this, as shown in FIGS. 2C and 3C, when the disk is close to the objective lens, the spot size of the +1-order diffracted beam is small, and the spot size of the −1-order diffracted beam is large. Therefore, when the difference between a total of outputs PD1+PD2+PD3 from the PD1, PD2, and PD3 and a total of outputs PD4+PD5+PD6 from the PD4, PD5, and PD6 is calculated, focus error detection by the complementary SSD method. The focus error detection method by the complementary SSD method has the following advantages in comparison with a "knife edge method" which is also realized. That is, the position of the HOE is not necessarily exactly adjusted, one of the ±1-order diffracted beams need not be rejected, high efficiency can be obtained.

As described above, when the error detection method and the prior art of the embodiment of the error detection method are considered, in focus error detection by the "knife edge method", the positional relationship between an HOE diffracted beam and a PD division line must be exactly set. Even in the assembly process of only the device, adjustment using a disk and a reproduced signal as an index must be performed, and large-scale equipment and processes are required. In addition, it is difficult to actually obtain the arrangement using both the ±1-order diffracted beams, and only one of the diffracted beams is used. For this reason, the efficiency is low, and an increase in load on the LD, degradation of signal quality, or the like are caused. Furthermore, when the "DPD method" is to be combined to the tracking error detection by the method, the diffracted beam is divided in two. The half is used in focus error detection, and the other half is used in tracking error detection. For this reason, the efficiency is degraded, and, in the "DPD method" in which four divided regions must be originally used, two regions are used in place of the four divided regions. Therefore, offset correction of a tracking error cannot be easily performed.

In comparison with this method, the "SSD method" is used in focus error detection in the integrated device described in the reference ("Integrated Optical Head for DVD"). The problems described above are partially improved by combining the focus error detection to the tracking error detection by the "DPD method". More specifically, position adjustment can be omitted, and degradation of efficiency is prevented by both the ±1-order diffracted beams of HOE. However, design is made to use one of the ±1-order diffracted beams for only a focus error and the other for only a tracking error. One of the ±1-order diffracted beams is rejected for each error signal. This is disadvantageous in efficiency. Even if the dividing method for light-receiving regions without changing the design, a focus error signal and a tracking error signal cannot be detected by both the diffracted beams.

SUMMARY OF THE INVENTION

It is an object of the present invention to provide an error detection device and method which can simultaneously detect a focus error signal and a tracking error signal with high efficiency and high precision by using both ±1-order diffracted beams, and an optical pickup device using the error detection device.

In order to achieve the object, from the first aspect of the present invention, there is provided an error detection method for detecting, from a reflected beam of a beam converged on an information recording medium on which optical information is recorded in the form of tracks, a tracking error signal representing relative positions of a convergence spot and an information reading target point and a focus error signal representing a convergence state of the converged beam on the information recording medium, the error detection method comprising: diffracting the reflected beam by a hologram having two divided regions and converging or diverging the diffracted beam; receiving respective ±1-order diffracted beams obtained by the regions of the hologram by using four light-receiving regions which are apart from a central point of the hologram through which an optical axis of the reflected beam passes by a distance optically equal to the distance between the central point of the hologram and a convergence (focal) point of the 0-order reflected beam; and causing the light-receiving regions to have a plural photoelectric conversion regions divided into two photoelectric conversion regions or three photoelectric conversion regions by combination, calculating signals obtained from the three photoelectric conversion regions of each of the light-receiving regions to obtain a focus signal, and, at the same time, calculating signals obtained from the two photoelectric conversion regions of each of the light-receiving regions to obtain a tracking signal. In this case, the "optically equal distance" is calculated in consideration of "extension of optical path" in a medium having a refractive index different from that in the air, and it must be regarded that the distance is generally different from a mechanical distance.

According to this invention, the reflected beam from the information recording medium on which optical information is recorded in the form of tracks is divided into two beams by the two regions of the hologram, and the positional relationship between the two regions of the hologram and the two photoelectric conversion regions of each of the light-receiving regions such that each of the two beams are divided into two beams by the two photoelectric conversion regions of each of the light-receiving regions for receiving the ±1-order diffracted beams obtained by causing the hologram to diffract the two beams. As a result, since the reflected beam is divided into four beams, a necessary condition:Eor detecting a tracking error signal by a DPD method is satisfied. In addition, since the tracking signal is obtained by using all photoelectric conversion signals obtained from the two photoelectric conversion regions of each of the four light-receiving regions, the tracking signal is obtained by using all the ±1-order diffracted beams. Since the light-receiving regions which receive the ±1-order diffracted beams obtained from the regions of the hologram are apart from the central point of the hologram through which the optical axis of the reflected beam passes by the distance optically equal to the distance between the central point of the hologram and the convergence (focal) point of the 0-order reflected beam, the condition that a focus error signal is obtained by the SSD method using both the ±1-order diffracted beams is satisfied, and the focus error signal is obtained by using all the photoelectric conversion signals obtained from the three photoelectric conversion regions of each of the four light-receiving element regions. For this reason, the focus error signal is obtained by using both the ±1-order diffracted beams.

From the second aspect of the present invention, there is provided an error detection device for detecting, from a reflected beam of a beam converged on an information recording medium on which optical information is recorded in the form of tracks, a tracking error signal representing relative positions of a convergence spot and an information reading target point and a focus error signal representing a convergence state of the converged beam on the information recording medium, the error detection device comprising: a hologram element having first and second divided regions, for diffracting the reflected beam in different directions in units of the regions, and having a lens function; a first light-receiving element region, having four divided photoelectric conversion regions, for receiving a +1-order diffracted beam diffracted by the first region of the hologram element; a second light-receiving element, having four divided photoelectric conversion regions, for receiving a −1-order diffracted beam diffracted by the first region of the hologram element; a third light-receiving element region, having four divided photoelectric conversion regions, for receiving a +1-order diffracted beam diffracted by the second region of the hologram element; and a fourth light-receiving element region, having four divided photoelectric conversion regions, for receiving a −1-order diffracted beam diffracted by the second region of the hologram element; wherein a region division line of the hologram element and photoelectric conversion region division lines of the first to fourth light-receiving element regions are set in a predetermined direction, and the first to fourth light-receiving element regions are arranged apart from a central point of the hologram through which an optical axis of the reflected beam passes by a distance almost optically equal to the distance between the central point of the hologram and a convergence (focal) point of the 0-order reflected beam.

According to this invention, the reflected beam is diffracted into two beams by the two regions of the hologram element in different directions. In addition, when the ±1-order diffracted beams diffracted by the regions are incident on the first to fourth light-receiving element regions, the positional relationship between the two regions of the hologram element and the four regions of the photoelectric conversion regions is properly set. In this case, each of the diffracted beams is divided into two beams by two regions obtained by combining the four regions of the photoelectric conversion regions. In this manner, as a result, the reflected beam is divided into four beams on the stages of the diffracted beams, and a necessary condition for obtaining a tracking error signal by a DPD method is satisfied. Therefore, photoelectric conversion signals obtained from the two regions obtained by combining the four regions of the first to fourth light-receiving element regions are calculated to obtain a tracking error signal. At this time, by using both the ±1-order diffracted beams, the tracking error signal is calculated. Sincethefirsttofourthlight-receivingelement regions which receive the ±1-order diffracted beams obtained from the regions of the hologram element are arranged apart from the central point of the hologram element through which the optical axis of the reflected beam passes by the distance optically equal to the distance between the central point of the hologram and the convergence (focal) point of the 0-order reflected beam, the condition that a focus error signal is obtained by the SSD method using both the ±1-order diffracted beams is satisfied. When the focus error signal is obtained by calculating all the photoelectric conversion signals obtained from the three regions obtained by combining the four regions of each of the four light-receiving element regions, the focus error signal is obtained by using both the ±1-order diffracted beams.

Preferably, the first light-receiving element region and the second light-receiving element region may be oppositely arranged with a predetermined distance, and a division line for dividing the light-receiving element regions in two may be on a first straight line. The third light-receiving element region and the fourth light-receiving element region may be oppositely arranged with a predetermined distance, and a division line for dividing the light-receiving element regions in two may be on a second straight line. The crossing point between the first and second straight lines is approximately arranged near the optical axis of the reflected beam, and the acute crossing angle may be set within the range of 3° to 20°.

According to this arrangement, when the first light-receiving element region and the second light-receiving element region are oppositely arranged with the predetermined distance, the division line for dividing these light-receiving element regions is arranged on the first straight line, and the hologram element, the first light-receiving element region, and the second light-receiving element region are arranged such that the diffraction direction of the ±1-order diffracted beams obtained by one region of the hologram element is on the first straight line, the condition that a focus error signal is obtained by the SSD method using both the ±1-order diffracted beams obtained by one region of the hologram element is satisfied. When the third light-receiving element region and the fourth light-receiving element region are oppositely arranged with the predetermined distance, the division line for dividing these light-receiving element regions is arranged on the second straight line, and the hologram element, the third light-receiving element region, and the fourth light-receiving are arranged such that the diffraction direction of the ±1-order diffracted beams obtained by the other region of the hologram element is on the second straight line, the condition that a focus error signal is obtained by the SSD method using both the ±1-order diffracted beams obtained by the other region of the hologram element is satisfied.

Preferably, the four photoelectric conversion regions of each of the light-receiving element regions may be classified into two groups to form two photoelectric conversion regions, and photoelectric conversion signals obtained from the two photoelectric conversion regions of each of the light-receiving element regions may be calculated to obtain the tracking error signal.

Preferably, the four photoelectric conversion regions of each of the light-receiving element regions may be classified into three groups to form three photoelectric conversion regions, and photoelectric conversion signals obtained from the three photoelectric conversion regions of each of the light-receiving element regions may be calculated to obtain the focus error signal.

From the third aspect of the present invention, there is provided an optical pickup device for converging a beam emitted from a semiconductor laser beam source on an information recording medium on which optical information is recorded in the form of tracks through an optical system, and for detecting, from a reflected beam obtained from the information recording medium at this time, at least a tracking error signal representing relative positions of a convergence spot and an information reading target point and a focus error signal representing a convergence state of the converged beam on the information recording medium, the optical pickup device comprising: a hologram element having first and second divided regions, for diffracting the reflected beam in different directions in units of the regions, and having a lens function; a first light-receiving element region, having four divided photoelectric conversion regions, for receiving a +1-order diffracted beam diffracted by the first region of the hologram element; a second light-receiving element, having four divided photoelectric conversion regions, for receiving a −1-order diffracted beam diffracted by the first region of the hologram element; a third light-receiving element region, having four divided photoelectric conversion regions, for receiving a +1-order diffracted beam diffracted by the second region of the hologram element; and a fourth light-receiving element region, having four divided photoelectric conversion regions, for receiving a −1-order diffracted beam diffracted by the second region of the hologram element; wherein a region division line of the hologram element and photoelectric conversion region division lines of the first to fourth light-receiving element regions are set in a predetermined direction, and the first to fourth light-receiving element regions are arranged apart from a central point of a hologram by a distance almost optically equal to the distance between the central point of the hologram and a convergence (focal) point of the reflected beam.

According to this invention, the reflected beam is diffracted into two beams by the two regions of the hologram element in different directions. In addition, when the ±1-order diffracted beams diffracted by the regions are incident on the first to fourth light-receiving element regions, the positional relationship between the two regions of the hologram element and the four regions of the photoelectric conversion regions is properly set. In this case, each of the diffracted beams is divided into two beams by two regions obtained by combining the four regions of the photoelectric conversion regions. In this manner, as a result, the reflected beam is divided into four beams on the stages of the diffracted beams, and a necessary condition for obtaining a tracking error signal by a DPD method is satisfied. Therefore, photoelectric conversion signals obtained from the two regions obtained by combining the four regions of the first to fourth light-receiving element regions are calculated to obtain a tracking error signal. At this time, by using both the ±1-order diffracted beams, the tracking error signal is calculated. Since the first to fourth light-receiving element regions which receive the ±1-order diffracted beams obtained from the regions of the hologram element are arranged apart from the central point of the hologram element through which the optical axis of the reflected beam passes by the distance optically equal to the distance between the central point of the hologram and the convergence (focal) point of the 0-order reflected beam, the condition that a focus error signal is obtained by the SSD method using both the ±1-order diffracted beams is satisfied. When the focus error signal is obtained by calculating all the photoelectric conversion signals obtained from the three regions obtained by combining the four regions of each of the four light-receiving element regions, the focus error signal is obtained by using both the ±1-order diffracted beams. The semiconductor laser beam source, a part of the optical system, the hologram element, and the light-receiving element regions are easily integrally packaged.

BRIEF DESCRIPTION OF THE DRAWINGS

FIGS. 1A and 1B are plan and sectional views showing the principle of a conventional SSD method, in which

DETAILED DESCRIPTION OF THE PREFERRED EMBODIMENTS

Embodiments of the present invention will be described below with reference to the accompanying drawings.

Figure 4:
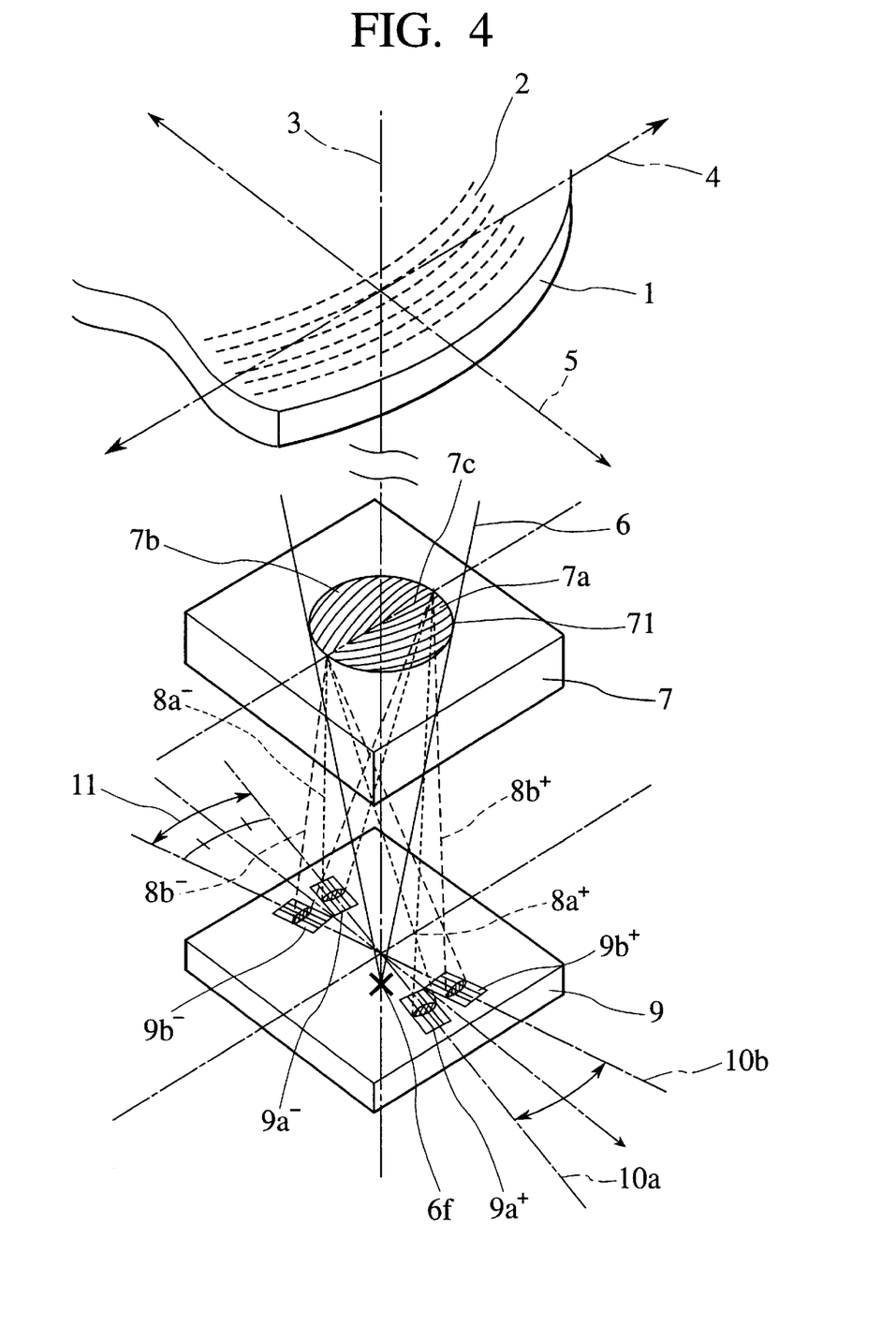
FIG. 4 is a perspective view showing an embodiment of an error detection device according to the present invention.

Referring to FIG. 4, a light-receiving element substrate 9 is arranged, with a predetermined positional relationship, to a hologram substrate 7 on which a hologram 71 having a beam diffraction function and a lens function is formed. The hologram substrate 7 is arranged to an optical disk 1 with a predetermined positional relationship. Tracks 2 in which information is recorded is formed on the surface of the optical disk 1. An optical axis 3 of a reflected beam 6 from the optical disk 1 is located at a read position of the track 2, the tangential direction of the crossing point between the optical axis 3 and the track 2 is a tangential direction 4, and a direction perpendicular to the tangential direction 4 is a radial direction 5.

The circular hologram 71 having a center set at a point through which the optical axis 3 passes is formed at the center of the hologram substrate 7, and the hologram 71 is divided into a first region 7a and a second region 7b by a division line 7c crossing the optical axis 3 in the same direction as the tangential direction 4.

On the light-receiving element substrate 9, four light-receiving regions (equal to light-receiving element regions) 9a+, 9a-, 9b+, and 9b- which receive ±1-order diffracted beams 8a+ and 8a- diffracted by the first region 7a of the hologram 71 and ±1-order diffracted beams 8b+ and 8b- diffracted by the second region 7b are arranged with the positional relationship shown in FIG. 4. And the four light-receiving regions 9a+, 9a-, 9b+, and 9b- are arranged on the light-receiving element substrate 9 such that a crossing point between a first straight line 10a passing through the center of the light-receiving regions 9a+ and 9a- and a second straight line 10b passing through the center of the light-receiving regions 9b+ and 9b- is approximately arranged near the optical axis 3 and a crossing angle (acute angle) 11 of these two straight lines is smaller than 20°, preferably, smaller than 12°.

Figure 5:
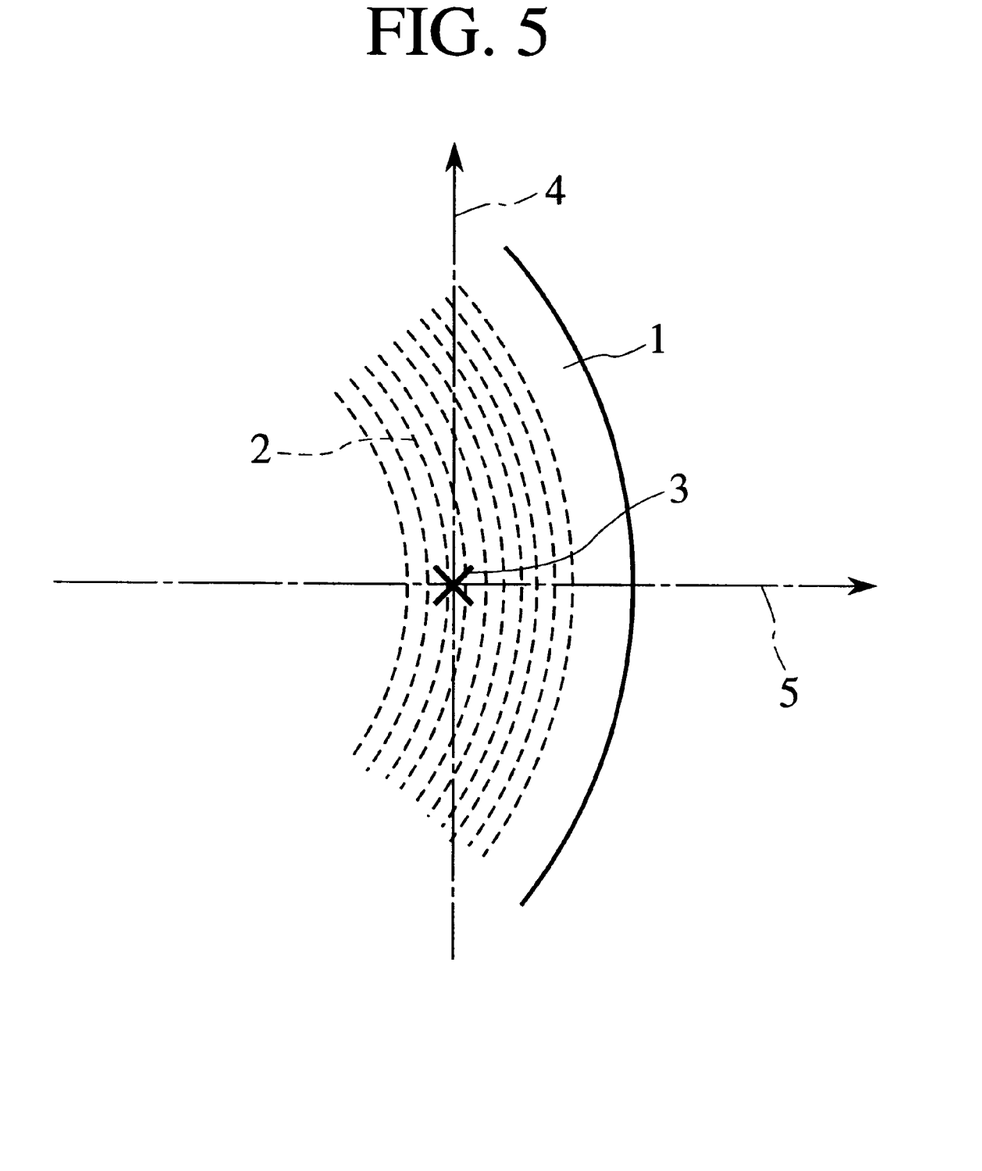
FIG. 5 is a plan view of an optical disk shown in FIG. 4.

The operation of this embodiment will be described below. A laser beam emitted from a semiconductor laser (LD) (not shown) is converged on the optical disk 1 by an optical system (not shown) including the hologram 71 of the hologram substrate 7, and the converged beam is modulated depending on the recorded information of the track 2 to be reflected through the same path as that in the incident process. The optical axis of the reflected beam 6 is the optical axis 3 shown in FIG. 5, and has a direction perpendicular to the drawing surface. The reflected beam 6 is incident on the hologram 71 of the hologram substrate 7 through an optical system such as an objective lens (not shown).

Since the hologram 71 is divided into the first region 7a and the second region 7b, the reflected beam 6 is diffracted by the first region 7a to be the ±1-order diffracted beams 8a+ and 8a−, and the il-order diffracted beams 8a+ and 8a− are incident on the light-receiving regions 9a+ and 9a− on the light-receiving element substrate 9. The reflected beam 6 is diffracted by the second region 7b to be the ±1-order diffracted beams 8b+ and 8b−, and the ±1-order diffracted beams 8b+ and 8b− are incident on the light-receiving regions 9b+ and 9b− on the light-receiving element substrate 9.

Figure 6:
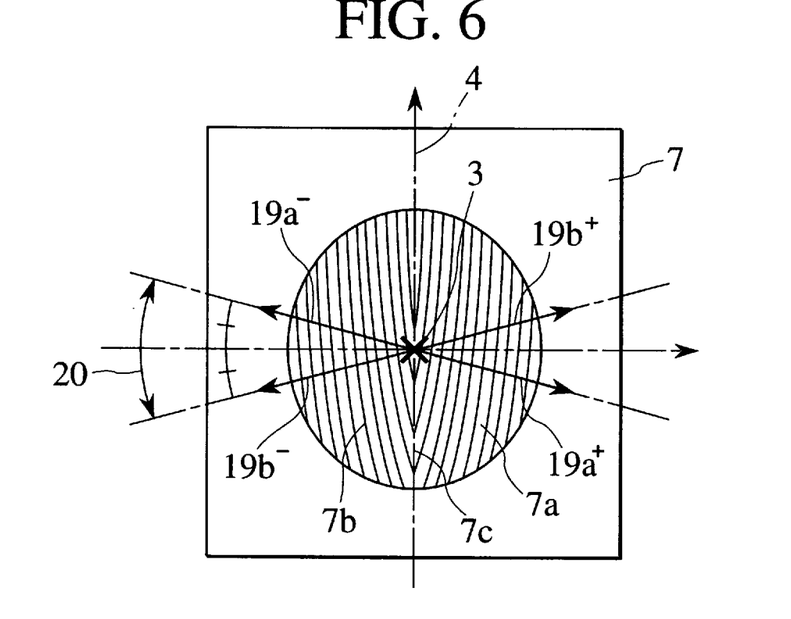
FIG. 6 is a plan view of a hologram substrate shown in FIG. 4.

Here, the diffraction direction of the ±1-order diffracted beam diffracted by the first region 7a of the hologram is indicated by 19a+ shown in FIG. 6, and the diffraction direction of the −1-order diffracted beam is indicated by 19a−. The +1-order diffracted beam diffracted by the second region 7b of the hologram is indicated by 19b+, and the diffraction direction of the −1-order diffracted beam is indicated by 19b−. In FIG. 6, an angle 20 between the diffraction directions of the first and second regions of the hologram is smaller than 20°, preferably, smaller than 12°.

Figure 7:
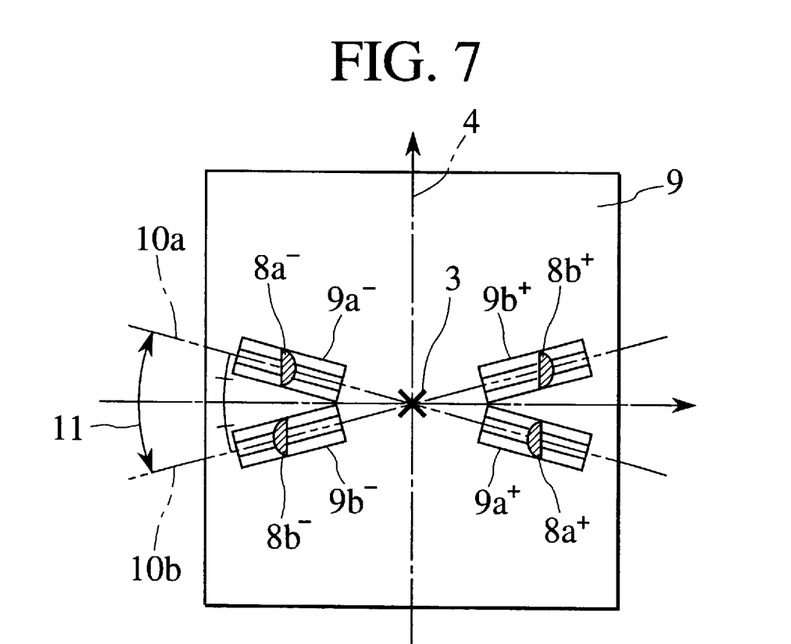
FIG. 7 is a plan view of a light-receiving element substrate shown in FIG. 4.

FIG. 7 is a plan view of the light-receiving element substrate 9. The first straight line 10a passing through the center between the light-receiving regions 9a+ and 9a− is on the diffraction direction 19a+ of the +1-order diffracted beam and the diffraction direction 19a− of the −1-order diffracted beam. The second straight line 10b passing through the center between the light-receiving regions 9b+ and 9b− is on the diffraction direction 19b+ of the +1-order diffracted beam and the diffraction direction 19b− of the −1-order diffracted beam.

Figure 8:
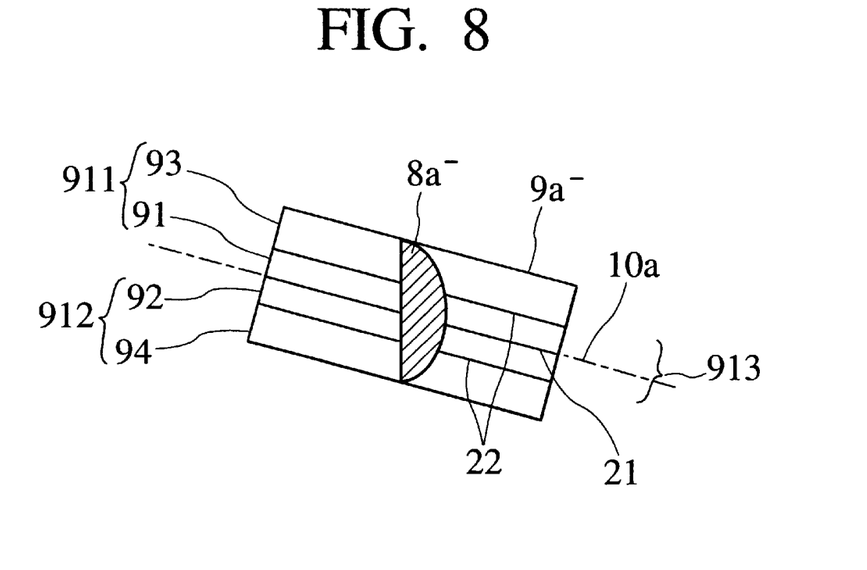
FIG. 8 is an enlarged view of a light-receiving region shown in FIG.7.

FIG. 8 is an enlarged view of the light-receiving regions 9a−. The light-receiving region 9a− is divided into four photoelectric conversion regions 91, 92, 93, and 94 by division lines 21 and 22, and the division line 21 is equal to the first straight line 10a. The −1-order beam 8a− generated by diffracting the reflected beam 6 by the first region 7a of the hologram 71 is incident on the photoelectric conversion regions 91, 92, 93, and 94 in the form of a half moon. The other light-receiving regions 9a+, 9b+, and 9b− arranged in the same manner as described above, and the corresponding beams 8a+, 8b+, and 8b− are incident on the respective light-receiving regions in the forms of half moons.

Figure 9:
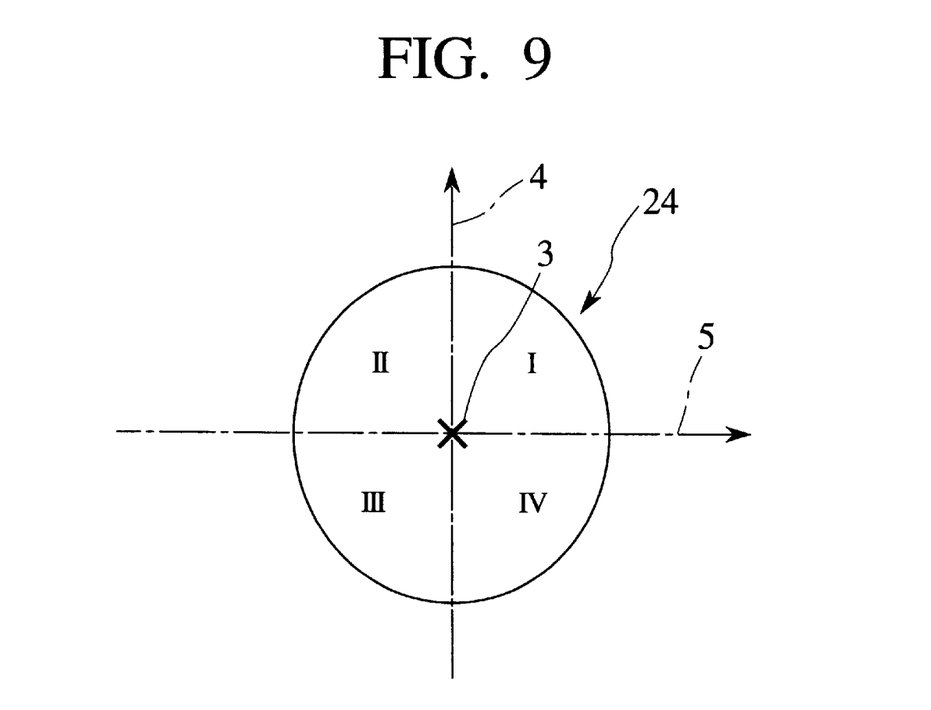
FIG. 9 shows coordinates for explaining a four-division state of a disk reflected beam shown in FIG. 4.

In this case, when the photoelectric conversion regions 91 and 93 are defined as a photoelectric conversion region 911, and the photoelectric conversion regions 92 and 94 are defined as a photoelectric conversion region 912, each of the light-receiving regions 9a+, 9a−, 9b+, and 9b− is divided in two. In addition, since a division line 21 between the two divided regions approximately directs in a direction perpendicular to the division line 7c of the hologram shown in FIG. 6, as a result, the reflected beam 6 is divided in four regions I, II, III, and IV, as indicated by the disk reflected beam pupil 24 in FIG. 9, by the first and second regions 7a and 7b of the hologram and the photoelectric conversion regions 911 and 912 obtained by dividing each light-receiving region into two regions.

Figure 10:
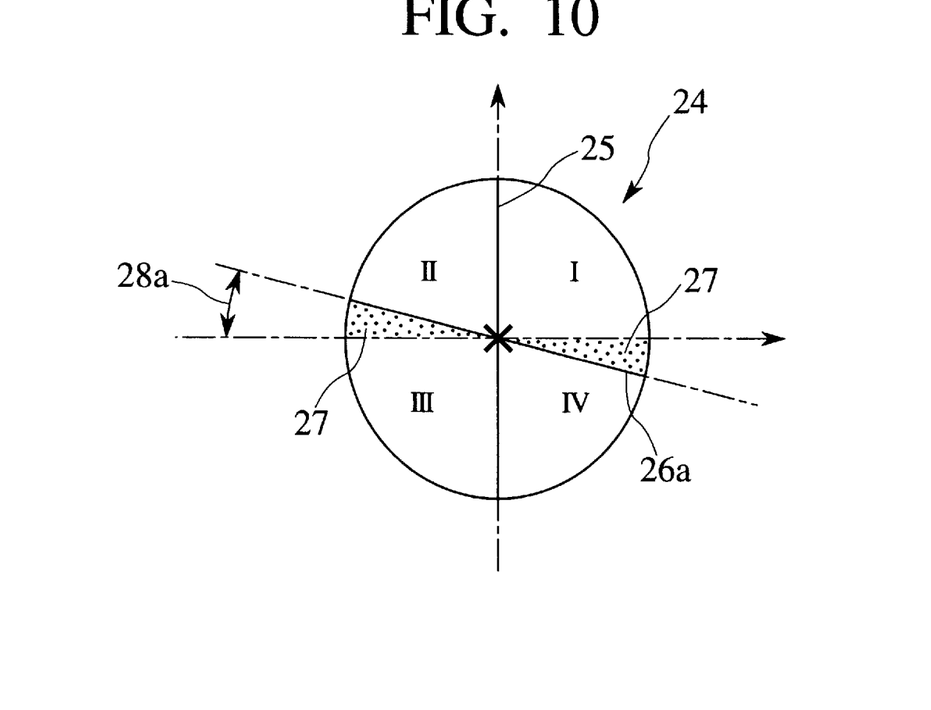
FIG. 10 shows coordinates showing offsets from an ideal beam division state in the DPD method in regions II and IV shown in FIG. 9.
Figure 11:
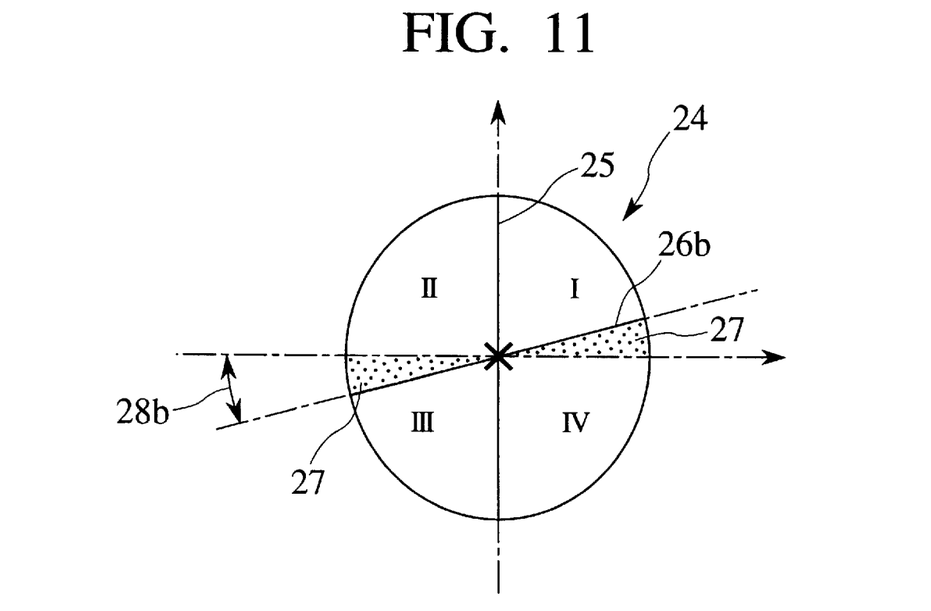
FIG. 11 shows coordinates showing offsets from an ideal beam division state in the DPD method in regions I and III shown in FIG. 9.

However, since the division line 21 between the two divided regions is formed at an exactly right angle with respect to the division line 7c of the hologram shown in FIG. 6, as shown in FIGS. 10 and 11, an offset 27 of a divided beam from a beam obtained by ideal beam division by the DPD method in each region is generated. Referring to FIG. 10 and FIG. 11, reference numeral 25 denotes a division line of a beam by hologram region division; 26a, a division line of a beam by light-receiving region division (10a); 26b, a division line of a beam by light-receiving region division (10b); 28a, an offset angle of the first straight line 10a from the radial direction 5; and 28b, an offset angle of the second straight line 10b from the radial direction 5. Therefore, in this embodiment, although there are offsets, a four-division condition which is a necessary condition of the DPD method is satisfied.

Returning to FIG. 8, when the photoelectric conversion regions 91 and 92 arranged inside the light-receiving region 9a− are defined as one photoelectric conversion region 913, each of the light-receiving regions 9a+, 9a−, 9b+, and 9b− is divided in three into the photoelectric conversion region 913 and the outside photoelectric conversion regions 93 and 94. For this reason, the necessary condition of the SSD method is satisfied with respect to one of the ±1-order diffracted beams. However, in order to apply the SSD method to both the ±1-order diffracted beams, a light-receiving region+for the ±1-order diffracted beam and a light-receiving region+for the −1-order diffracted beam must be arranged apart from the central point of the hologram 71 through which the optical axis 3 of the reflected beam 6 passes by distances which are almost optically equal to the distance between the central point of the hologram 71 and the convergence (focal) point 6f of the 0-order reflected beam 6. However, in this embodiment, the light-receiving regions 9a+, 9a−, 9b+, and 9b− are arranged on the light-receiving element substrate 9 to satisfy the condition, that is, the light-receiving regions 9a+, 9a−, 9b+, and 9b− are arranged as a same distance (optionally equal distance) from the central point of the hologram 71 as the distance from the central point of the hologram 71 to the convergence (focal) point 6f of the reflected beam 6, and a lens function is given to the hologram 71 to obtain this arrangement.

Figure 12:
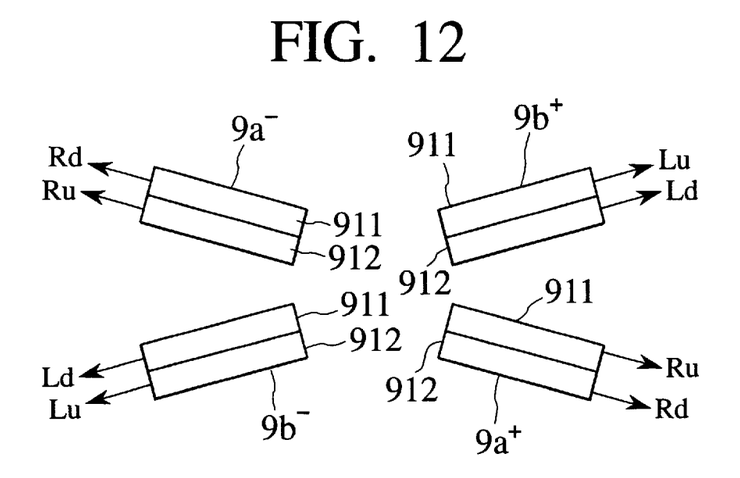
FIG. 12 is an explanatory diagram showing a method of calculating a tracking error signal from four light-receiving regions by the DPD method.

FIG. 12 is an explanatory diagram showing a method of calculating a tracking error signal from the four light-receiving regions 9a+, 9a−, 9b+, and 9b− by the DPD method. Photoelectric conversion signals obtained from the two divided photoelectric conversion regions 911 and 912 of the light-receiving element region 9a+ are indicated by Ru and Rd, and photoelectric conversion signals obtained from the two divided photoelectric conversion regions 911 and 912 of the light-receiving element region 9a− are indicated by Rd and Ru. Photoelectric conversion signals obtained from the two divided photoelectric conversion regions 911 and 912 of the light-receiving element region 9b+ are indicated by Lu and Ld, and photoelectric conversion signals obtained from the two divided photoelectric conversi on regions 911 and 912 of the light-receiving element region 9b− are indicated by Ld and Lu.

Sign als obtained by the ±1-order diffracted beams are added to each other. More specifically, for example, when signals having the same symbol are added to each other, e.g. , Ru+Ru=Ru, Ru, Rd, Lu, and Ld can be obtained. When the phases of [(Ru+Δt)+Ld] and [(Lu+Δt) +Rd] are compared with each other, a tracking error signal is obtained. This tracking error is an error generated by the of fset 27 (see FIGS. 10 and 11) of a divided beam from a beam obtained by ideal beam division in the DPD method.

Figure 13:
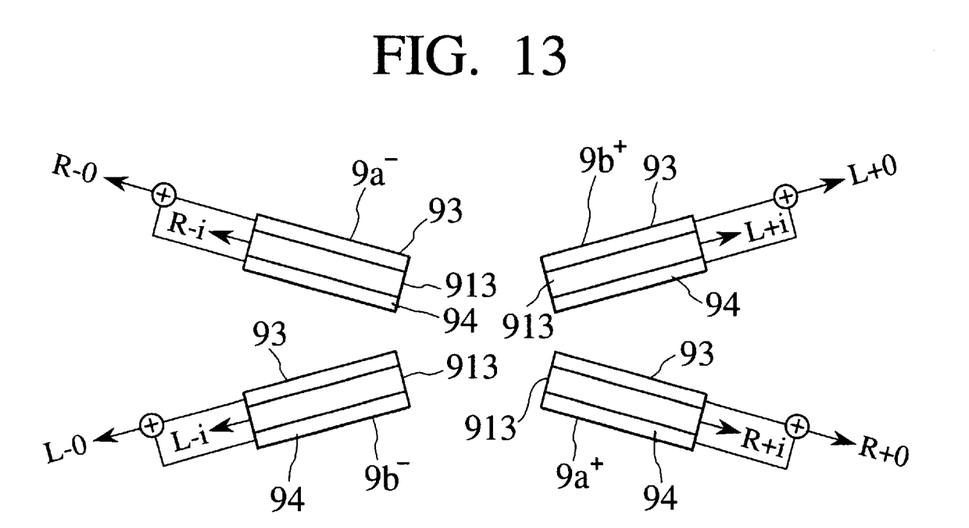
FIG. 13 is an explanatory diagram showing a method of calculating a focus error signal from four light-receiving regions by the SSD method.

FIG. 13 is an explanatory diagram showing a method of calculating a tracking error signal from the four lightreceiving regions 9a+, 9a−, 9b+, and 9b− by the SSD method.

A signal obtained by adding photoelectric conversion signals obtained from the photoelectric conversion regions 93 and 94 arranged outside the light-receiving region 9a+ is indicated by R+o, and a photoelectric conversion signal obtained from the photoelectric conversion region 913 arranged inside the light-receiving element region 9a+ is indicated by R+i. A signal obtained by adding photoelectric conversion signals obtained from the photoelectric conversion regions 93 and 94 arranged outside the light-receiving region 9a− is indicated by R−o, and a photoelectric conversion signal obtained from the photoelectric conversion region 913 arranged inside the light-receiving element region 9a− is indicated by R−i. A signal obtained by adding photoelectric conversion signals obtained from the photoelectric conversion regions 93 and 94 arranged outside the light-receiving region 9b+ is indicated by L+o, and a photoelectric conversion signal obtained from the photoelectric conversion region 913 arranged inside the light-receiving element region 9b+ is indicated by L+i. A signal obtained by adding photoelectric conversion signals obtained from the photoelectric conversion regions 93 and 94 arranged outside the light-receiving region 9b− is indicated by L−O, and a photoelectric conversion signal obtained from the photoelectric conversion region 913 arranged inside the light-receiving element region 9b− is indicated by L−i.

When the signals are determined as described above, a focus error signal=[L+i−L+O]+[R+i−R+O]−[L−i−L−O]−[R−i−R−O] is satisfied. Since signals are obtained from the four divided photoelectric conversion regions of each light-receiving region at the same time, the tracking error signal described in FIG. 12 and the focus error signal described in FIG. 13 are obtained at the same time. According to this embodiment, the hologram 71 of the hologram substrate 7 is divided into two regions 7a and 7b, and the four divided photoelectric conversion regions of each of the light-receiving regions 9a+, 9a−, 9b+, and 9b− are combined to each other to form the two divided photoelectric conversion regions 911 and 912, so that the reflected beam 6 from the optical disk 1 can be divided in four. For this reason, a tracking error signal can be obtained by the DPD method. In addition, in order to obtain the tracking error signal, the components of the +1-order diffracted beam and the −1-order diffracted beam are added to each other as shown in FIG. 12, and the signals obtained by both the diffracted beams are used. For this reason, efficiency of obtaining the tracking error signal is considerably improved. By this addition, the offsets 27 from a beam obtained by ideal beam division in the DPD method shown in FIG. 10 and FIG. 11 can be canceled by the ±1-order diffracted beam and the −1-order diffracted beam. Therefore, a tracking error signal having a high precision can be obtained.

In addition, three divided photoelectric conversion regions 93, 94, and 913 are formed by combining four divided regions of the light-receiving regions 9a+, 9a−, 9b+, and 9b−, and a light-receiving region 9a+ (9b+) and a light-receiving region 9a− (9b−) corresponding to the +1-order diffracted beam and the −1-order diffracted beam are arranged apart from the central point of the hologram through which the optical axis 3 of the reflected beam 6 passes by distances which are almost optically equal to the distance between the central point and the convergence point of the reflected beam 6. In this manner, by using both the ±1-order diffracted beams, a focus error signal can be efficiently obtained by the SSD method. In this case, since error signals included in the ±1-order diffracted beams are output in a canceling direction, the precision of the focus error signal can be improved by using both the signals.

The SSD method is used to calculate the focus error signal, a device having parts whose positions can be easily adjusted and good assembly properties can be manufactured at low cost.

In addition, since the DPD method is used to calculate the tracking error signal, a CD and a DVD can be compatibly reproduced without any problem. In this embodiment, the direction of the division line 7c of the hologram 71 is equal to the tangential direction 4, and the directions of the first and second straight lines 10a and 10b are almost equal to the radial direction 5. However, when the direction of the division line 7c is equal to the radial direction 5, and the directions of the first and second straight lines 10a and 10b are almost equal the tangential direction 4, the same effect as described above can be obtained.

Figure 14:
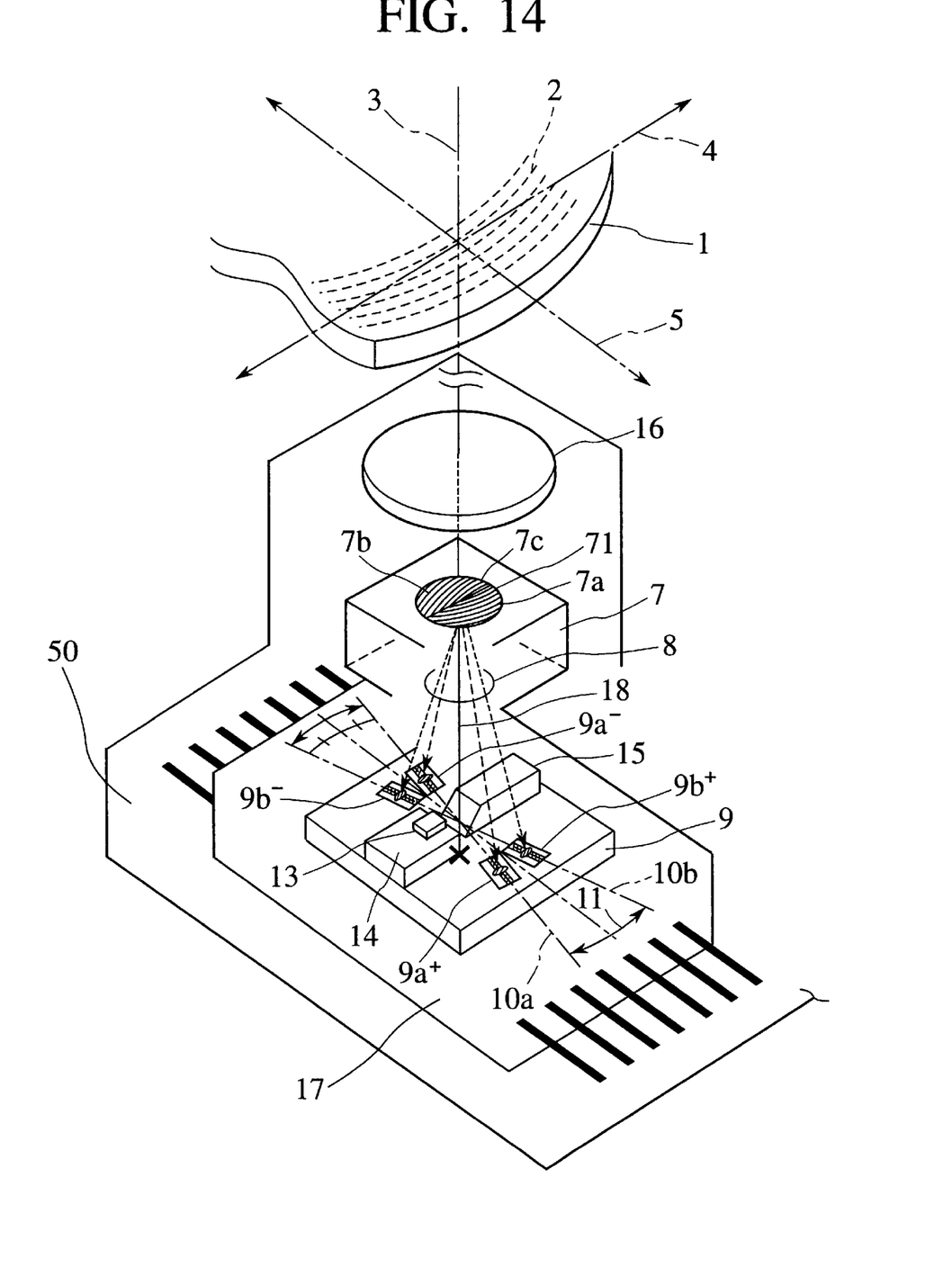
FIG. 14 is a perspective view showing an embodiment of an optical pickup device according to the present invention.

FIG. 14 is a perspective view showing an embodiment of an optical pickup device according to the present invention. The same reference numerals as in FIG. 4 denote the same parts in FIG. 14, and a description thereof will be omitted for descriptive convenience. An objective lens 16 is arranged between an optical disk 1 and a hologram substrate 7. A package 17 is arranged to a hologram substrate 7 with a predetermined positional relationship, and a light-receiving element substrate 9 is stored in the package 17. Light-receiving regions 9a+, 9a−, 9b+, and 9b− are arranged on the light-receiving element substrate 9, and a sub-mount 14 is arranged at the central portion of the light-receiving element substrate 9. A semiconductor laser (LD) 13 and a mirror 15 opposing the semiconductor laser 13 are arranged on the sub-mount 14. An emitted beam 18 emitted from the semiconductor laser 13 is changed in direction at a right angle and irradiated in the direction of the hologram substrate 7, and the optical axis of the emitted beam 18 is equal to an optical axis 3 of a reflected beam 6. The objective lens 16, the hologram substrate 7, the package 17, and the like are integrally stored in an optical pickup housing 50. The other arrangement and positional relationship are the same as those in the embodiment shown in FIG. 4.

The operation of this embodiment will be described below. The emitted beam 18 emitted from the semiconductor laser 13 is change in direction at a right angle, incident on a hologram 71 of the hologram substrate 7, and converged by the objective lens 16 to be focused on one point on the surface of an optical disk 1. The beam focused on the optical disk 1 is reflected, irradiated on the objective lens 16 through the same path, and incident on the hologram 71 of the hologram substrate 7. In this manner, the reflected beam is diffracted by regions 7a and 7b of the hologram 71. A +1-order diffracted beam and a −1-order diffracted beam which are obtained by the region 7a of the hologram 71 are incident on the light-receiving regions 9a+ and 9a−, and a +1-order diffracted beam and a −1-order diffracted beam which are obtained by the region 7b of the hologram 71 are incident on the light-receiving regions 9b+ and 9b−.

The arrangement of the reflected beams 6 from the light-receiving regions 9a+, 9a−, 9b+, and 9b− with respect to the convergence point is the same as that in FIG. 4. Each light-receiving region is divided in four by using the first straight line 10a and the second straight line 10b as central division lines as in FIG. 4, and two divided photoelectric conversion regions and three divided photoelectric conversion regions can be obtained at the same time by combining the divided light-receiving regions. When photoelectric conversion signals obtained from the light-receiving regions 9a+, 9a−, 9b+, and 9b− are calculated, information signals recorded on the optical disk 1 can be obtained.

Therefore, in this embodiment, by using both the ±1-order diffracted beams of the hologram, a tracking error signal can be obtained by the DPD method, and a focus error signal can be obtained by the SSD method. The same effect as that in the embodiment shown in FIG. 4 can be obtained. Since a hologram is used as an optical system, the light-receiving element substrate 9, the semiconductor laser 13, and the other optical system can be packaged as one body (including integration), and a compact device having a light weight can be constituted.

As has been described above, according to the present invention, the SSD method and the DPD method are combined to each other, and a focus error signal and a tracking error signal can be obtained at the same time by using both ±1-order diffracted beams obtained by a hologram. For this reason, these error signals can be obtained with high precision and high efficiency, and miniaturization, simplification, and cost reduction of the optical system of an optical pickup can be achieved.

What is claimed is:

1. An error detection method for detecting, from a reflected beam of a beam converged on an information recording medium on which optical information is recorded in the form of tracks, a tracking error signal representing relative positions of a convergence spot and an information reading target point and a focus error signal representing a convergence state of the converged beam on the information recording medium, the error detecting method comprising:

diffracting the reflected beam by a hologram having two divided regions and converging or diverging the diffracted beam;

receiving respective ±1-order diffracted beams obtained by the regions of the hologram by using four light-receiving regions which are apart from a central point of the hologram through which an optical axis of the reflected beam passes by a distance optically equal to the distance between the central point of the hologram and a focal point of the 0-order reflected beam; and causing the light-receiving regions to have a plural photoelectric conversion regions divided into two photoelectric conversion regions or three photoelectric conversion regions by combination, calculating signals obtained from the three photoelectric conversion regions of each of the light-receiving regions to obtain a focus signal, and, at the same time, calculating signals obtained from the two photoelectric conversion regions of each of the light-receiving regions to obtain a tracking signal.

2. An error detection device for detecting, from a reflected beam of a beam converged on an information recording medium on which optical information is recorded in the form of tracks, a tracking error signal representing relative positions of a convergence spot and an information reading target point and a focus error signal representing a convergence state of the converged beam on the information recording medium, the error detection device comprising:

a hologram element having first and second divided regions, for diffracting the reflected beam in different directions in units of the regions, and having a lens function;

a first light-receiving element region, having four divided photoelectric conversion regions, for receiving a ±1-order diffracted beam diffracted by the first region of the hologram element;

a second light-receiving element region, having four divided photoelectric conversion regions, for receiving a −1-order diffracted beam diffracted by the first region of the hologram element;

a third light-receiving element region, having four divided photoelectric conversion regions, for receiving a +1-order diffracted beam diffracted by the second region of the hologram element; and a fourth light-receiving element region, having four divided photoelectric conversion regions, for receiving a −1-order diffracted beam diffracted by the second region of the hologram element;

wherein a region division line of the hologram element and photoelectric conversion region division lines of the first to fourth light-receiving element regions are set in a predetermined direction, and the first to fourth light-receiving element regions are arranged apart from a central point of the hologram through which an optical axis of the reflected beam passes by a distance almost optically equal to the distance between the central point of the hologram and a focal point of the 0-order reflected beam.

3. An error detection device according to claim 2, wherein the first light-receiving element region and the second light-receiving element region are oppositely arranged with a predetermined distance, a division line for dividing the light-receiving element regions in two is on a first straight line, the third light-receiving element region and the fourth light-receiving element region may be oppositely arranged with a predetermined distance, a division line for dividing the light-receiving element regions in two is on a second straight line, the crossing point between the first and second straight lines is approximately arranged near the optical axis of the reflected beam, and the acute crossing angle may be set within the range of 3° to 20°.

4. An error detection device according to claim 2, wherein the four photoelectric conversion regions of each of the light-receiving element regions is classified into two groups to form two photoelectric conversion regions, and photoelectric conversion signals obtained from the two photoelectric conversion regions of each of the light-receiving element regions are calculated to obtain the tracking error signal.

5. An error detection device according to claim 2, wherein the four photoelectric conversion regions of each of the light-receiving element regions are classified into three groups to form three photoelectric conversion regions, and photoelectric conversion signals obtained from the three photoelectric conversion regions of each of the light-receiving element regions are calculated to obtain the focus error signal.

6. An optical pickup device for converging a beam emitted from a semiconductor laser beam source on an information recording medium on which optical information is recorded in the form of tracks through an optical system, and for detecting, from a reflected beam obtained from the information recording medium at this time, at least a tracking error signal representing relative positions of a convergence spot and an information reading target point and a focus error signal representing a convergence state of the converged beam on the information recording medium, the optical pickup device comprising:

a hologram element having first and second divided regions, for diffracting the reflected beam in different directions in units of the regions, and having a lens function;

a first light-receiving element region, having four divided photoelectric conversion regions, for receiving a +1-order diffracted beam diffracted by the first region of the hologram element;

a second light-receiving element region, having four divided photoelectric conversion regions, for receiving a −1-order diffracted beam diffracted by the first region of the hologram element;

a third light-receiving element region, having four divided photoelectric conversion regions, for receiving a +1-order diffracted beam diffracted by the second region of the hologram element; and a fourth light-receiving element region, having four divided photoelectric conversion regions, for receiving a −1-order diffracted beam diffracted by the second region of the hologram element;

wherein a region division line of the hologram element and photoelectric conversion region division lines of the first to fourth light-receiving element regions are set in a predetermined direction, and the first to fourth light-receiving element regions are arranged apart from a central point of a hologram by a distance almost optically equal to the distance between the central point of the hologram and a focal point of the 0-order reflected beam.

* * * * *

UNITED STATES PATENT AND TRADEMARK OFFICE
CERTIFICATE OF CORRECTION

PATENT NO. : 6,207,942 B1
DATED : March 27, 2001
INVENTOR(S) : Minoru Ohyama

It is certified that error appears in the above-identified patent and that said Letters Patent is hereby corrected as shown below:

Column 13,
Line 15, "±" should be -- + --

Signed and Sealed this

Fourteenth Day of August, 2001

Attest:

Nicholas P. Godici

Attesting Officer

NICHOLAS P. GODICI
Acting Director of the United States Patent and Trademark Office